United States Patent [19]

Van Melle

[11] Patent Number: 4,552,522

[45] Date of Patent: Nov. 12, 1985

[54] SEGMENTED SPACER RING

[75] Inventor: Hugh Van Melle, Etobicoke, Canada

[73] Assignee: Amhil Enterprises Ltd., Mississauga, Canada

[21] Appl. No.: 604,303

[22] Filed: Apr. 26, 1984

[30] Foreign Application Priority Data

Dec. 23, 1983 [CA] Canada .................................. 444228

[51] Int. Cl.[4] ......................... B29C 1/14; B29C 17/00
[52] U.S. Cl. ..................................... 425/182; 425/183; 425/193; 425/195; 425/388; 425/420; 425/809
[58] Field of Search ................ 249/100, 102; 425/182, 425/183, 193, 195, 388, 809, 420

[56] References Cited

U.S. PATENT DOCUMENTS 2,153,087  4/1939  Knapp .............................. 249/102 X
3,114,956 12/1963  Gannaway ...................... 249/100 X Primary Examiner—Jay H. Woo
Assistant Examiner—Joye L. Woodard
Attorney, Agent, or Firm—Donald E. Hewson

[57] ABSTRACT

Apparatus is disclosed for making sheet-plastic articles, such as lids for disposable drinking cups, by vacuum forming. The invention provides spacers that fit into the holes in the stripper plate of the apparatus for the purpose of matching the size of the hole closely to that of the die impression. The spacers are flanged and in three segments, the segments being so arranged that two of the segments can be first placed in the hole, their flanges being entered into a groove in the hole, then the third is located in the hole and maneuvered radially outwards until its flange too is located in the groove. The segments are retained in place with a spring ring. The segmented spacers can easily be inserted at arm's length and by feel alone. The spacers are themselves radially thin so that the holes in the stripper plate can be packed tightly together.

7 Claims, 3 Drawing Figures

SEGMENTED SPACER RING

BACKGROUND OF THE INVENTION

This invention relates to production apparatus having multi-impression dies for vacuum forming articles in sheet plastic.

In such apparatus, the many die forms are detachably fixed in a die platten. It is the conventional practice to provide a stripper plate to peel the plastic sheet off the die forms after the forming operation. The stripper plate has holes in it corresponding to the die-forms, and it is arranged that the plastic sheet is sucked, by the vacuum, against the die-forms through the holes in the stripper plate, but that the rest of the sheet, i.e., that portion of the sheet between the die-forms, lies against the stripper plate. After forming has taken place, the stripper plate is moved some small distance away from the die platten; the sheet of plastic moves with it, causing the formed areas to release from their respective die-forms.

Vacuum-formed plastic articles often have a lip comprising a portion of their form disposed in a direction substantially at right angles to the plane of the web of material from which the article was made. A lid for a disposable drinking cup is a typical example of such an article, in that such a lid has a lip around its periphery, which in some cases is actually slightly re-entrant with respect to the web. The re-entrant shape is important in providing a positive snap when the lid is fitted to the cup.

Such a lip, especially when it is re-entrant, means that there can be some difficulty in stripping the web of moulded articles from the die-forms. It is important to apply the stripping force as closely as possible to the edge of the article. If there is a land of any appreciable size between the lip and where the stripping force is applied, then the material will tend to flex in that land, which could cause the formed shape to turn inside out.

It is desirable therefore, from the point of view of an efficient and reliable stripping operation, to see that the edge of the die-form clearance holes in the stripper plate lie as closely as possible to the lip or edge of the formed shape.

When the articles are always the same size, then it is a simple matter to provide holes in the stripper plate of such a diameter that the edges of the holes are the desired small distance from the lip of the article. When, however, it is required to use the same vacuum forming apparatus to produce articles in batches that are sometimes one size, sometimes another, then a separate stripper plate for each batch would be needed. When one considers also that not all the die-forms of a multi-impression die platten might need to be changed from batch-to-batch, one can see that the number of stripper plates needed would be quite uneconomical.

Thus, there are three alternatives when carrying out vacuum forming in batches: first, the production engineer might provide large holes in the stripper plate, which would allow various sizes of die-form to be used but would means that only on the largest of the sizes could the stripping be regarded as a reliable operation; second, the production engineer might decide to provide a large number of stripper plates, each with a set of holes that correspond very closely with a particular set-up or arrangement of die-forms, but now he is faced with the enormous cost of making all the stripper plates, and of changing them over between batches; or, thirdly, he might decide to use spacers.

With the use of spacers, only one stripper plate need be provided, and this plate has holes to cater for the largest dieforms. When the plate is used with smaller die-forms, a suitable spacer is inserted to bring the edge of the hole in the stripper plate in effect closer to the edge of the formed shape.

A problem with the use of spacers is that the variation in hole size is quite small. Again taking the example of disposable drinking cup lids, the difference in diameter lid-to-lid might be 1 mm; it would be a problem to secure a spacer to the holes in the stripper plate, which has a radial thickness of only 0.5 mm, particularly since the die-forms are packed as tightly as possible so that the hole-to-hole spacing is very small. Furthermore, the spacers should be assemble-able from one side of the stripper plate without access at all to the other side of the stripper plate, if the spacers are to be changed with the plate in situ.

For these reasons, the conventional methods of securing spacers to the stripper plate, such as bolting them in, turn out to have great drawbacks to the economics of bath production. It is an aim of the present invention to provide a manner of constructing and arranging the spacers which allows batch production to be economically achieved. Another requirement is that the spacer must effectively be in the form of a continuous ring, i.e., there can be no gaps since, if there were, they would act like the wide lands described above. It is assumed for the purpose of description that the die-form, and hence the spacer, is circular, but other shapes are possible.

BRIEF DESCRIPTION OF THE INVENTION

In the invention, the spacer is in the form of a ring and is provided with a radially projecting flange that is complementary to a groove formed in the wall of the hole in the stripper plate. In order to assemble the spacer in such a way that the flange can be inserted into the groove, the spacer is in three segments.

The manner of fitment of the segments of the spacer ring is this. Two of the segments are placed each with the flange in the groove. This can be done so long as the part of the circumference occupied by the remaining segment is more than the depth of the groove. The abutment between respective ends of the first two segments (termed the first-to-second abutment) needs to be such that there are no gaps between those segments, or rather, not at least in that face of the completed spacer ring that will act as an exension of the edge of the hole in the stripper plate.

The third segment is then placed in the gap left between the respective other ends of the first two segments. In order that there should be no gaps left between the first two segments and the third segment the first-to-third abutment and the second-to-third abutment should be planar, and the planes should either be parallel to each other or should converge radially outwardly. Thus, the third segment can be slid into position in the groove in the direction defined by the parallel planes, without leaving any gaps on the said face of the spacer ring, which is thereby completed. The segments may be held in place by a spring ring acting radially outwards to hold the flanges on the segments in the groove in the stripper plate.

For symmetry, the first-to-second abutment may be planar and radial to the ring. The first and second segments may be mirror images of each other, the first-tothird and second-to-third abutments being parallel to a radius of the ring.

The segments can be manufactured by simply turning the ring on a lathe then cutting the segments. Naturally, since there are to be no gaps at the abutments of the segments, not all the segments can be made from a single turned ring.

It is possible, using the spacer of the invention, to provide a very versatile batch-production system, with just one stripper plate, even when the permanent holes in the stripper plate are not all of the same size. The largest of the die-forms in this case would not have any spacers since it would be arranged that the very largest die-form was a tight fit in the largest of the holes. The smallest of the die-forms on the other hand are provided with a number of sets of segments, whereby the impression may be fitted to any of the permanent holes in the stripper plate, whether small or large. Thus virtually any combination of impressions may be produced, just for the cost of providing the segmented rings, which, as will be appreciated, is very small. The economies of production that are made possible are extremely worthwhile. Because of the ease with which the segments can be made, it is no difficulty to make many sets of segments for each impression.

DETAILED DESCRIPTION OF THE PREFERRED EMBODIMENT

The production apparatus includes a fixed die platten 40. A stripper plate 50 slides up and down on guides, relatively to the platten 40.

Figure 1:
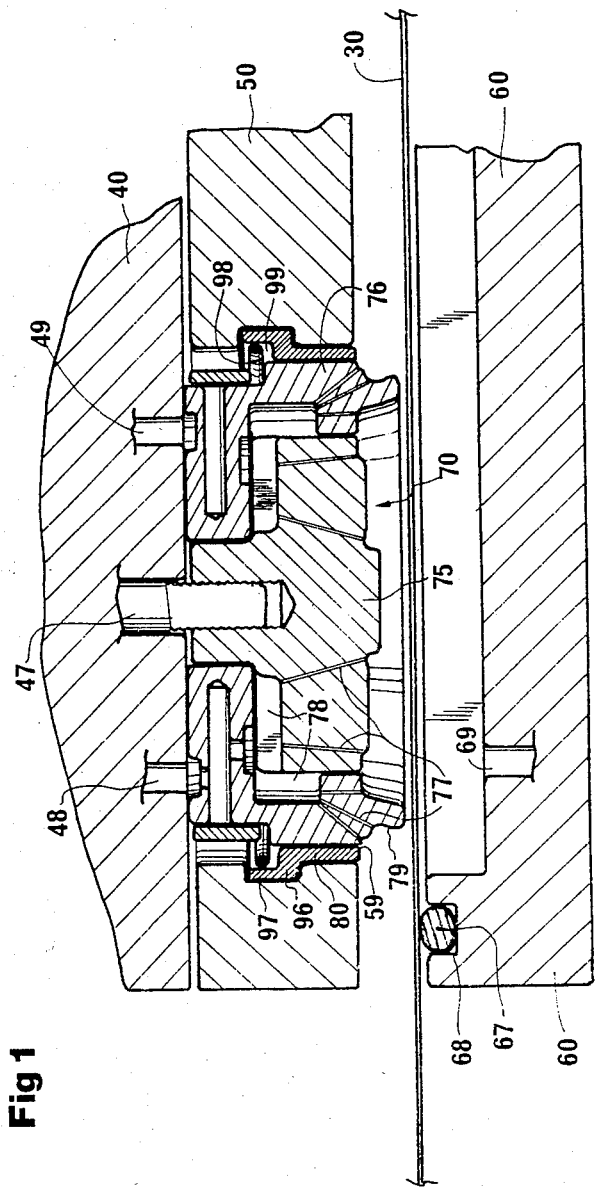
FIG. 1 is a section of a production apparatus for making vacuum-formed articles.

A series of vacuum-forming mould impressions or cavities are fixed to the platten. One such cavity 70 is shown in FIG. 1, and it is fixed to the platten 40 by means of a bolt 47.

The cavity 70 has an inner part and an outer part. The outer part 76 of the cavity 70 is trapped between the platten 40 and the inner part 75 as the bolt 47 is tightened, so that the two parts together comprise a unitary cavity. The bottom faces of the two parts 75, 76 are machined to the shape to which it is desired to form the plastic article.

Tiny holes 77 connect the bottom faces of the cavity with an air chamber 78 inside the cavity 70. The chamber 78 is in communication with ports 48, 49 via the various cross drillings and channels as illustrated.

The apparatus includes a bottom platten 60 which is furnished with an elastomeric seal 67 that fits in a groove 68 running around the periphery of the upper surface of the bottom platten 60.

In operation, a hot extruded sheet 30 of plastic is fed between the stripper plate 50 and the bottom platten 60. The sheet 30 is indexed into position beneath the cavities 70. The bottom platten 60 is then raised so that the seal 67 presses the sheet 30 against the stripper plate 50. This action provides an airtight seal not only between the bottom of the sheet 30 and the bottom platten 60 but also between the top of the sheet 30 and the stripper plate 50.

Vacuum forming is carried out by extracting air from the port 48. The air is drawn through the tiny holes 77, causing the sheet to be sucked onto the shape of the cavity 70. This action is assisted by the simultaneous application of air pressure to the bottom platten 60 through an air port 69. The sheet 30 is left in its deformed condition for a few seconds until it has cooled sufficiently to be firm enough to retain its new shape.

The bottom platten 60 is now lowered clear. The stripper plate 50 is also pressed downwards, to strip the sheet 30 away from the cavity 70. At the same time, air is blown out, from port 49, through the holes 77 in the cavity 70. The combined action of the movement of the stripper plate 50 and the air blowing through the cavity 70 is effective to strip the (now shaped) sheet 30 from the cavity 70. After stripping, the sheet 30 is indexed forward, and the cycle repeats.

The plastic article being made in this case is a lid for a disposable drinking cup. Such lids usually have a re-entrant form, as at 79, on a peripheral lip of the lid. It is important, for reliable stripping, that the effective stripping edge 59 of the hole be as close as possible to the re-entrant form 79. If there is an annular land between the edge 59 and the form 79, then the plastic in the area of the land will bend, which can cause the moulded article to flip inside-out.

However, if the hole in the stripper plate 50 were simply made to be just slightly larger than the lip of the lid, then the hole would have to be dedicated to that size of lip. Thus, a new stripper plate 50 would have to be provided for each size of lid, which would be quite uneconomical. To make matters worse, the lids are usually made in batches, several sizes together on one platten, the proportion required by each size being different batch-to-batch. To have a new stripper plate 50 for each batch would be even more uneconomical.

In the invention, spacer rings 80 are provided, to alleviate this problem.

If it can be arranged that no spacer ring is needed for the largest lids, with a thin spacer for the next largest lid, and so on, then the holes in the stripper plate can be packed tightly together. If, however, the spacer ring were to occupy quite a large radial spacer itself, then the holes in the stripper plate would have to be more spaced out, to the detriment of the number of cavities in the platten.

If the ring were to be bolted in, for instance, the radial space needed for the bolts would affect the hole-spacing. Alternatively, the ring might itself be provided with a screw thread, and be screwed into the hole in the stripper plate: if so, the ring need not be radially thick, for little radial space would be needed. But such screw threads would hardly be able to cope with the day-to-day abuse they would receive during cavity changes in a practical production press.

Besides, the holes into which the spacer rings are to be fitted are underneath the stripper plate (it would be uneconomical to take the stripper plate off to change the cavities) and are thus not only at arms length, but are also virtually invisible.

Figure 3:
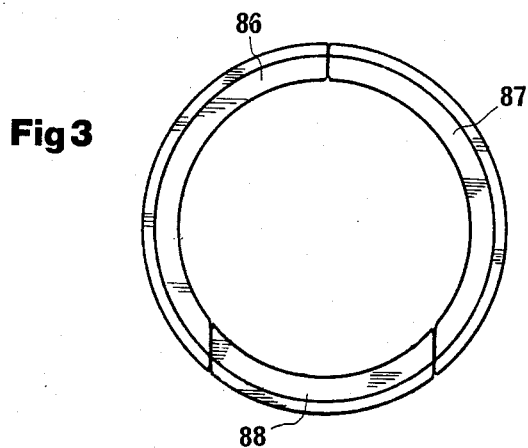
FIG. 3 is a plan view of a spacer ring.
Figure 2:
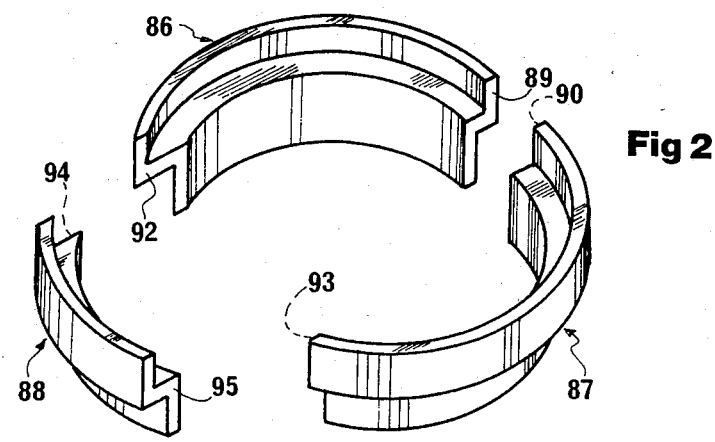
FIG. 2 is a pictorial view of a segmented spacer ring.

The segmented spacer ring of the invention is aimed at overcoming these problems. The ring 80 is in three segments 86, 87, 88. The first 86 and second 87 segments are mirror images of each other. The respective one end 89, 90 of the first 86 and second 87 segments are planar and lie in a plane which, when those ends 89, 90 are abutted, includes a radius of the ring 80. The respective other ends 92, 93 are also planar, and lie in planes that are parallel to the said radius. The third segment 88 has two ends 94, 95 which are planar and which lie in the planes of the said other ends 92, 93 of the first 86 and second 87 segments. All this can be clearly seen in FIGS. 2 and 3.

The segmented spacer ring 80 has a flange 96, and the hole in the stripper plate 50 has a groove 97 of complementary shape to the flange 96. To assemble the ring 80 into the hole, the first 86 and second 87 segments are simply laid in the hole, the portions of the flange 96 that occupy those segments being pushed fully into the groove 97. Then, the third segment 88 is placed in the hole, and simply moved radially outwards, the ends of the third segment sliding over the ends 94, 95 of the first 86 and second 87 segments, until the remaining portion of the flange 96 that occupies the third segment 88 has been pushed fully into the groove 97. This operation can be easily carried out, by feel, at arm's length.

The segments 86, 87, 88 can then be secured in place by a spring ring 98, which fits in a recess in the spacer ring 80, and which presses the segments outwards against the sides of the hole in the stripper plate 50. Lastly, the cavity 70 is bolted to the platten 40, inside the completed spacer ring 80.

The three segments 86, 87, 88 are shown as being substantially of the same circumferential length. This is not a requirement; the first 86 and second 87 segments must together comprise sufficiently less than the complete ring 80 that they can both be fitted into the hole. How much less depends on the depth of the groove 97 and flange 96.

The ends of the segments need not all be parallel; the requirement is that all the segments must be radially movable into position, and that there should be no gaps between the ends when the segments are assembled. The ends of the third segment 88 therefore cannot be divergent radially outwardly if this condition is to be achieved: they could, however, be convergent.

Other shapes besides circular are possible for the ring, depending on the cavity and ultimately on the article that is being produced.

The segmented rings 80 are inexpensive to produce, being simply turned on a lathe, and then cut into lengths. Naturally, two turnings must be made and cut up to produce the three segments of one ring. Each cavity 70 may have a set of segmented rings 80, so that the cavity 70 may be used at many of the holes in the stripper plate. The smallest cavity 70 may have a set of many thicknesses of segmented rings, so that that cavity may be used with not only the smallest holes but right through to the largest holes. This makes for very versatile, and hence economic, batch production.

What is claimed is:

1. The combination of a plate and a spacer ring for effectively reducing the size of a hole in the plate, where the ring has a flange, and the hole is provided, in its inwardfacing surface, with a groove complementary to the flange, characterised in that:
   the ring is in three segments, arranged so that when the three segments are abutted the segments comprise a complete ring with no gaps;
   in that the first and second of the three segments comprise sufficiently less than the complete ring that in the absence of the third segment the first and second segments can each be assembled into the hole with the respective flanges on the segments fully inserted into the groove, and with respective one ends of each of the first and second segments in an abutment that lies in a plane which includes a radius of said ring;
   and in that the respective other ends of the first and second segments are not, in substance, divergent radially outwardly, but are shaped as to allow the third segment to be inserted between them in a generally radial direction until the flange on the third segment is fully inserted into the groove, the ends of the third segment then being in an an abutment with the respective other ends of the first and second segments that lies in a plane parallel to the plane which includes said radius.

2. The combination of claim 1, wherein the ends of the three segments are all planar.

3. The combination of claim 2, wherein the first segment is a mirror image of the second.

4. The combination of claim 1, wherein the segments are held in place in the hole by means of a spring ring which urges all the segments radially outwardly.

5. The combination of claim 4, wherein a recess is provided on the inside of the ring to receive the spring ring.

6. The combination of a plate and a spacer ring for effectively reducing the size of a hole in the plate, where the ring has a flange, and the hole is provided, in its inward-facing surface, with a groove complementary to the flange, characterised in that:
   the ring is in three segments, arranged so that when the three segments are abutted the segments comprise a complete ring with no gaps;
   in that the first and second of the three segments comprise sufficiently less than the complete ring that in the absence of the third segment the first and second segments can each be assembled into the hole with the respective flanges on the segments fully inserted into the groove, and with respective one ends of each of the first and second segments in an abutment that lies in a plane which includes a radius of said ring;
   in that the respective other ends of the first and second segments are not, in substance, divergent radially outwardly, but are shaped as to allow the third segment to be inserted between them in a generally radial direction until the flange on the third segment is fully inserted into the groove, the ends of the third segment then being in an abutment with the respective other ends of the first and second segments that lies in a plane parallel to the plane which includes said radius;
   in that the plate is the stripper plate of a vacuum forming apparatus for moulding articles in sheet plastic;
   and in that the stripper plate has several holes, and each hole is provided with a respective one of the said spacer rings.

7. The combination of claim 6, wherein the holes are of differing diameters.

* * * * *